United States Patent [19]

Carlson

[11] Patent Number: 5,253,543

[45] Date of Patent: Oct. 19, 1993

[54] HELM/CABLE LATCHING MECHANISM

[75] Inventor: John A. Carlson, Wayne, Pa.

[73] Assignee: Teleflex Incorporated, Limerick, Pa.

[21] Appl. No.: 599,655

[22] Filed: Oct. 18, 1990

[51] Int. Cl.⁵ .................................................. F16C 1/10
[52] U.S. Cl. ............................ 74/501.5 R; 74/502.4;
74/502.6; 403/328
[58] Field of Search ............................ 74/502.4–502.6,
74/479, 501.5 R; 285/317, 91; 403/327, 328, 9

[56] References Cited

U.S. PATENT DOCUMENTS

| | | | |
|---|---|---|---|
| 2,172,294 | 9/1939 | Riddell | 74/502 |
| 3,208,300 | 9/1965 | Morse | 74/502.6 X |
| 3,702,708 | 11/1972 | Moore | 285/91 X |
| 3,710,645 | 1/1973 | Bennett | 74/502.4 O |
| 3,830,579 | 8/1974 | Roe | 403/328 X |
| 4,175,450 | 11/1979 | Bennett | 74/502.4 O |
| 4,331,041 | 5/1982 | Bennett | 74/502.4 X |
| 4,579,476 | 4/1986 | Post | 403/328 X |
| 4,645,368 | 2/1987 | Simpson et al. | 403/328 X |
| 4,688,445 | 8/1987 | Spease et al. | 74/502 X |
| 4,841,806 | 6/1989 | Spease | 74/502.5 X |
| 4,872,367 | 10/1989 | Spease | 74/500.5 X |

Primary Examiner—Carl D. Friedman
Assistant Examiner—Winnie Yip
Attorney, Agent, or Firm—Reising, Ethington, Barnard, Perry & Milton

[57] ABSTRACT

A steering helm (11) for a boat (13) having a motion-transmitting core element assembly (10) connected between the steering helm (11) of a boat (13) and a steering system (15). The motion-transmitting core element assembly (10) has a motion-transmitting core element (12) extending through a conduit (14) to the steering system (15). The conduit (14) is attached to the steering helm (28) via a coupler (16). The coupler (16) comprises a female housing (28) and a male coupler (22). The male coupler (22) is attached to the flexible conduit (14) and is substantially cylindrical with an outer diameter smaller than the first inner diameter of female housing (28). The male coupler (22) has a leading chamfered surface (24) and a relief (26) disposed adjacent to the leading chamfered surface (24). The female housing (28) has a locking assembly (30) comprising a ring (32) and a spring (34). The ring (32) has an inner chamfered surface (40) and a flat side surface (38) wherein the flat side surface (38) abuts the relief (26) of the male coupler (22) when the male coupler (22) is fully inserted into the female housing (28). The spring (34) biases the ring (32) off-axis, thus locking the male coupler (22) in place. A hole (42) in the female housing (28) receives a tool to force the ring (32) on-axis thereby unlocking the male coupler (22).

17 Claims, 2 Drawing Sheets

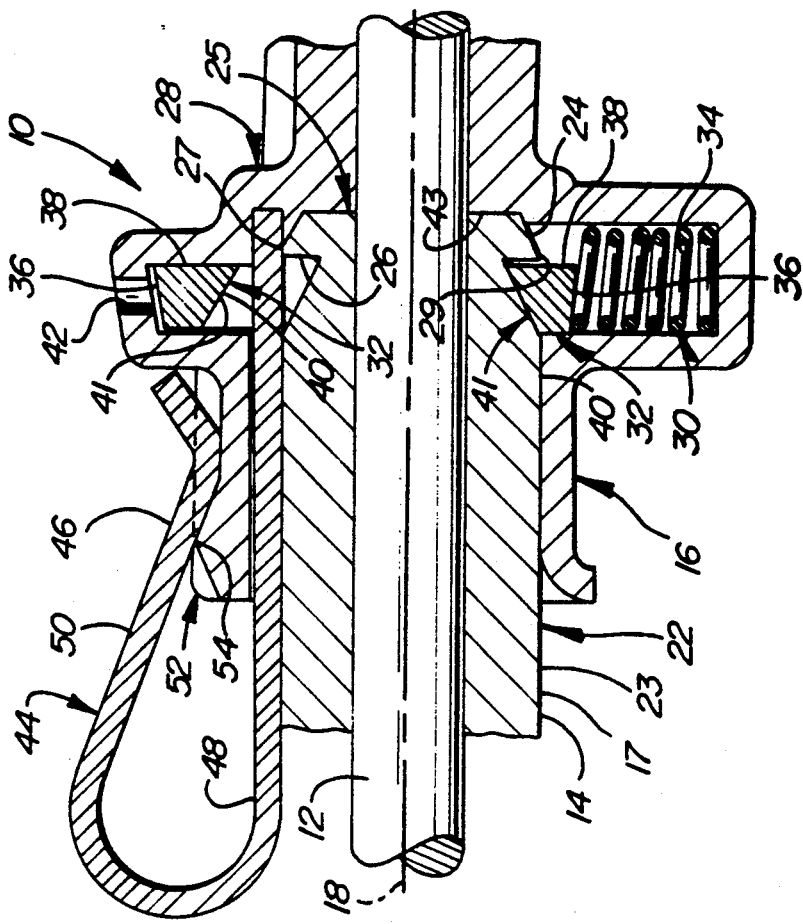
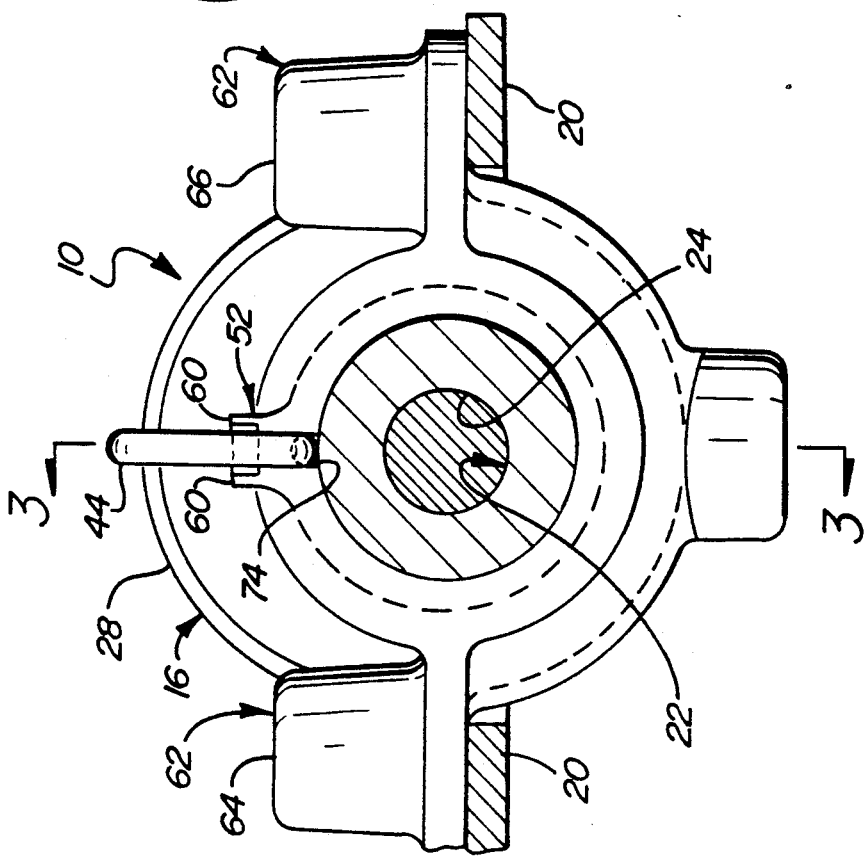

HELM/CABLE LATCHING MECHANISM

BACKGROUND OF THE INVENTION

1. Field of Invention

The subject invention relates to a steering assembly in a recreational boat of the type including a steering helm for steering input and a motion transmitting core element extending from the steering helm through a conduit to the steering or rudder system of the boat. More specifically, the invention relates to the connection between the conduit and the housing of the steering helm.

2. Description of Related Art

Conduit latching mechanisms of the type with which the instant invention is particularly applicable typically include a conduit with a male coupler attached at the end thereof and a female coupler for receiving the male coupler. The female coupler is designed to allow that which passes through the conduit—typically a motion-transmitting core element—to pass therethrough. The motion-transmitting core element may be of any type suitable for movement within a guide means. For example, such motion-transmitting core elements are frequently utilized as push/pull mechanisms in marine craft for steering mechanism, throttle controls or the like. Frequently, the conduit must pass through an aperture and a fitting is disposed in the aperture to support the conduit in the aperture. In many of the prior art assemblies, fittings which attach the core element to a control member or which support the conduit frequently engage an aperture by being snapped into mechanical engagement with the aperture. An example of such a fitting is shown in U.S. Pat. No. 4,688,445 to A. L. Spease et al, which is assigned to the assignee of the subject invention.

A facility that the prior art assemblies do not have is the facility of locking the conduit into the aperture in a bulkhead or to a support structure using a coupling wherein the locking mechanism is fully enclosed in the coupling for eliminating secondary locking systems.

U.S. Pat. No. 2,172,294 to Riddell discloses a ratchet cable release wherein the flexible core element is locked into one of a plurality of positions. The flexible core element comprises one end having a set of ratchet teeth and each of these ratchet teeth representing a position in which the flexible core element can be locked. An incompressible plug having a ratchet tooth complimentary to the ratchet teeth of the flexible core element is spring-biased to lock the flexible core element in one of the plurality of positions. This ratchet cable release, however, is limited to the position of the flexible core element and is not directed toward a flexible conduit latching mechanism for attaching a flexible conduit to a support structure such as a bulkhead.

SUMMARY OF THE INVENTION AND ADVANTAGES

The subject invention includes a motion-transmitting remote control assembly of the type for use in conjunction with steering helms for marine craft. More particularly, the subject invention is of the type for transmitting forces along a curved path by a flexible motion-transmitting core element in relation to a support structure. The assembly includes a flexible conduit having opposite ends. The flexible conduit defines the longitudinal axis. The subject invention further includes coupling means for removably securing the flexible conduit to a support structure or a bulkhead. The coupling means includes a male coupler having a leading chamfered surface and a relief disposed adjacent the leading chamfered surface. The relief is also perpendicular to the longitudinal axis. The coupling means further includes female housing means which is fixedly secured to the support structure and is used for receiving the male coupler therein. The subject invention further includes locking means fully enclosed in the female housing means of the coupling means for removably securing the male coupler inside the female housing means. The locking means includes ring means having a flat side surface and a single inner chamfered surface. The inner surface is chamfered to allow the leading chamfered surface and the relief, both of the male coupler, to pass therethrough. The locking means further includes biasing means for continuously biasing the ring means into abutting engagement with the male coupler. The relief of the male coupler circumscribes the flexible conduit for allowing the male coupler and the flexible conduit to be removably secured to the female coupling means in any one of a plurality of rotational orientations about the longitudinal axis. The subject invention is characterized by lock access means for unlocking the locking means by forcing the ring means on-axis in relation to the longitudinal axis.

The subject invention has the advantage of supporting a conduit against a support structure wherein the conduit is removable locked therein by the abuttment of two incompressible surfaces which are totally enclosed within the female housing means thus reducing the need for secondary locking systems.

FIGURES IN THE DRAWINGS

Other advantages of the present invention will be readily appreciated as the same becomes better understood with reference to the following description when considered in connection with the accompanying drawings wherein:

FIG. 2 is an end view of the subject invention with a retaining clip shown in phantom; and FIG. 3 is a cross-sectional view taken along line 3—3 of FIG. 2.

DETAILED DESCRIPTION OF THE DRAWINGS

Figure 1:
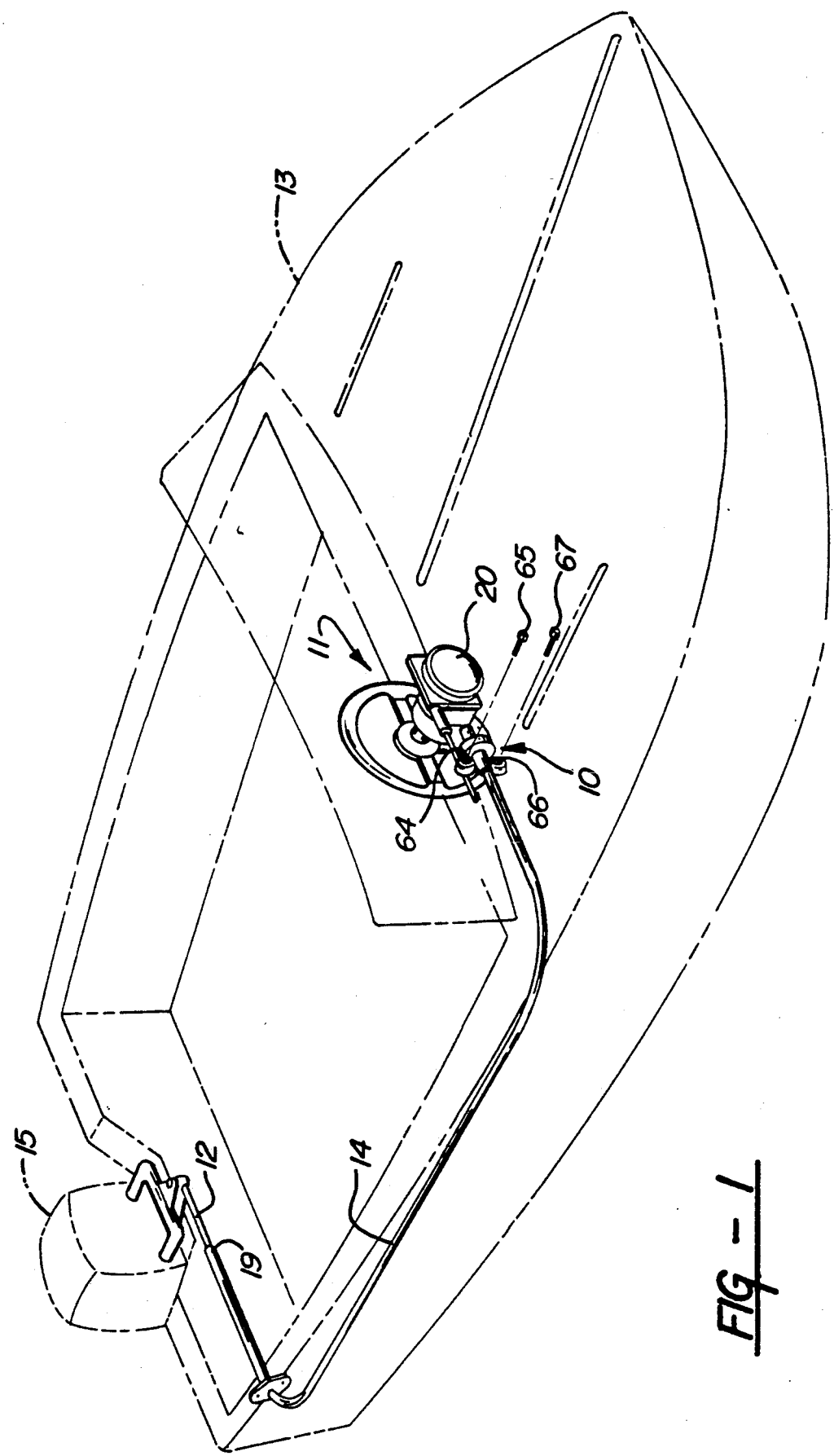
FIG. 1 is a perspective view of the subject invention connected to a steering helm of a boat which is shown in phantom.

Referring now to the drawings, a remote control assembly constructed in accordance with the subject invention is generally shown at 10. The remote control assembly includes a motion-transmitting core element 12, a flexible conduit 14, and coupling means 16.

As may be seen in FIG. 1, the subject invention 10 is connecting the steering helm, generally shown at 11, and the flexible conduit 14 together. The steering helm 11 steers the boat 13, shown in phantom, by moving the outboard motor 15 via the motion-transmitting core element 12 which is substantially enclosed in the flexible conduit 14.

A flexible conduit 14 comprises an elongated, hollow, cylindrical conduit 14 having opposite ends 17,19 wherein the center of the flexible conduit 14 defines a longitudinal axis 18. The flexible motion-transmitting core element 12 passes through the hollow portion of the flexible conduit 14.

The coupling means 16 is used for removable securing the flexible conduit 14 to a steering helm 20. The steering helm 20 may be used in marine craft wherein the rotational motion of the steering wheel of the steering helm 20 is transmitted via the flexible motion-transmitting core element 12. The coupling means 16 includes a male coupler, generally indicated at 22. The male coupler 22 comprises a substantially cylindrical body portion 23 having a nose end 25 disposed at the end thereof. The nose end 25 comprises leading chamfered surface 24 and a relief 26. The leading chamfered surface 24 is frustoconical in shape, i.e., the shape of a frustum, which provides for easier insertion into the female housing means 28 and easier engagement with the locking means 30, both of which will be discussed in greater detail subsequently. The relief 26 is disposed adjacent the leading chamfered surface 24 and perpendicular to the longitudinal axis 18. The leading chamfered surface 24 and the relief 26 may be contiguous or, as in the subject invention 10, may be separated by a flat or beveled edge 27. Both the leading chamfered surface 24 and the relief 26 circumscribe the male coupler 22, i.e., they extend around the whole circumference of the male coupler 22. The male coupler 22 is attached to the flexible conduit 14 via any means of fastening well-known in the art i.e., insertion molding or snapping pieces.

The coupling means 16 further includes a female housing means, generally indicated at 28. The female housing means 28 is fixedly secured to the support structure 20 and receives the male coupler 22 therein.

Located inside the female housing means 28 is the locking means, generally indicated at 30. The locking means 30 is fully enclosed by the female housing means 28 and removably secures the male coupler 22 therein. The locking means 30 includes ring means 32 and biasing means 34. The ring means 32 is a single ring 32 having a frustoconical outer surface 36. The ring 32 also includes a single flat side surface 38 and a single inner chamfered surface 40. The single flat side surface 38 and the single inner chamfered surface 40 create a single tooth 41 which extends around the inner circumference of the ring 32. The single inner chamfered edge 40 coacts with the leading chamfered surface 24 of the male coupler 22 to allow the male coupler 22 to pass therethrough. The relief 26 of the male coupler 22 abutts the single flat side surface 38 of the ring 32 whenever the male coupler 22 is in position and not concentric with the ring 32. The male coupler 32 may be inserted into the female housing means 28 in any one of a plurality of rotational orientations about the longitudinal axis 18 because both the relief 26 of the male coupler 22 and the single flat side surface 38 of the ring 32 circumscribe their respective parts.

The locking means 30 further includes biasing means 34. The biasing means 34 continuously biases the ring 32 off-axis in relation to the longitudinal axis 18. When the male coupler 22 is inserted into the female housing means 28, the biasing means 34 continuously biases the ring 32 into abutting engagement with the relief 26 of the male coupler 22.

The assembly 10 is characterized by lock access means 42 for receiving a tool (not shown) in the female housing means 28. The tool may be any tool with a small round head at the end of a narrow neck wherein the neck is longer than the length of the lock access means 42. The lock access means 42 is placed diametrically opposite the biasing means 34 with respect to the ring 32. The tool is inserted into the lock access means 42 to apply a force to the ring 32 opposite in direction and coaxial in orientation to the force being applied to the ring 32 by the biasing means 34. Once the force applied to the ring 32 by the tool is greater than the force being applied by the biasing means 34, the ring 32 may be moved on-axis in relation to the longitudinally axis 18. This allows the male coupler 22 to be removed from the female housing means 28. The biasing means 34 of the locking means 30 typically comprises a compressible spring.

The lock access means 42 comprises a hole 42 extending through said female housing means 28. The axis of the hole 42 is coaxial with the center of the center of the spring 34 and is perpendicular to the longitudinal axis 18.

As best shown in FIG. 3, the ring means 32 has a predetermined thickness measured as the distance between the two side surfaces 37,38 of the ring means 32. The lock access means 42 limits the size of the unlocking force to an area wherein none of the dimensions of the area is large than the depth of the ring means 32. In addition, the lock access means 42 limits the orientations of the unlocking force to forces which are substantially perpendicular to the longitudinal axis 18.

The ring 32 is fabricated of a substantially incompressible material, e.g., metal or hard plastic, for receiving a compressive force from the male coupler 22 and the biasing means 34 for biasing the ring 32 off-axis in relation to the longitudinal axis 18 without the ring 32 collapsing into the flexible core element 12. In other words, to reduce the available area through which the male coupler 22 must pass to lock the male coupler 22 in the female housing means 28, the ring 32 is shifted off-axis in relation to the longitudinal axis 18 as opposed to collapsing the ring 32 into the male coupler 22. Said another way, the ring 32 is rigid.

The assembly 10 further includes retaining clip means 44 for selectively moving into and out of a locking position for locking the ring 32 off-axis in relation to the longitudinal axis 18. The retaining clip means 44 is a secondary safety feature and not a necessary part of the locking means 30. In other words, the locking means 30 independently locks the male coupler 22 in the female housing means 28. The retaining clip means 44 is present merely to prevent an inadvertent unlocking either by an accidental insertion of a tool into the hole 42 or by the biasing means 34 breaking. The retaining clip means 44 is shown in the locking position in FIG. 2. The retaining clip means includes a retaining clip 44 having first 48 and second 50 arms. The first 48 and second 50 arms extend substantially in the same direction and have a non-uniform space therebetween wherein the space has a small portion. The first arm 48 extends through the ring 32 when the retaining clip 44 is in the locking position. The second member 50 is received by the track means 52 of the female housing means 28. The track means 52 guides the retaining clip 44 and secures the retaining clip 44 in the locking position. The track means 52 further includes a ridge means 54 which prevent the retaining clip 44 from moving out of the locking position. In addition, the first arm 48 may be used as the tool for unlocking the male coupler 22 once the retaining clip 44 is removed from the locking position.

The ridge means 54 has a thickness greater than the small portion separating the first 48 and second 50 arms of the retaining clip 44. Therefore, the retaining clip 44 is resiliently forced over the ridge means 54. The track means 52 further includes guide means 60, shown in FIG. 1, disposed on either side of the track means 52. The guide means 60 align the retaining clip 44 so the first arm 48 of the retaining clip 44 may be substantially parallel to the longitudinal axis 18.

The female housing means 28 further includes attachments means 62 for attaching the female housing means 28 to the steering helm 20. The attachment means 62 comprises two mounting holes 64, 66. The two mounting holes 64, 66 receive mounting screws 65, 67, rivets or any other type of fastener known in the art. The two mounting holes 64, 66 are parallel to each other and lie in a plane that is perpendicular to the longitudinal axis 18. The two mounting holes 64, 66 are also spaced equidistant from the longitudinal axis. Obviously, varying the number of mounting holes and the spacing thereof in the female housing means 28 will result from specific applications of the subject invention 10 and will add nothing to the inventive process of the subject invention 10.

The female housing means 28 further includes first and second inner diameters. The first diameter is larger than the outer circumference of the male coupler 22. The second inner diameter is smaller than the first inner diameter for three reasons First, the wall 43 connecting the first and second diameters take the load created by the male coupler 22. Second the wall 43 acts as a stop to prevent the male coupler 22 from moving beyond a position suitable for the male coupler 22 to engage the locking means 30, thus rendering the locking means 30 ineffective. Third, the smaller diameter 70 guides the motion-transmitting core element 12 more effectively because their respective sizes are similar. This similarity reduces the probability of crimps and other such obstacles. The female housing means 28 further includes recess means 76 for receiving the first member 48 of the retaining clip 44.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A motion-transmitting remote control assembly (10) for use in conjunction with a steering helm assembly (11) for a marine craft (13) of the type for transmitting forces along a curved path by a flexible motion-transmitting core element (12), said motion-transmitting remote control assembly (10) comprising:
   a flexible conduit (14) having a longitudinal axis extending through opposite ends;
   coupling means (16) for removably securing said flexible conduit (14) to a support structure (20);
   said coupling means (16) including a male coupler (22) having an outer circumference, a leading nose (24) and a relief (26) disposed adjacent said leading nose (24) and perpendicular to said longitudinal axis (18);
   said coupling means (16) further including female housing means (28) fixedly secured to said support structure (20) for receiving said male coupler (22) therein;
   locking means (30) fully enclosed by said female housing means (28) for removably securing said male coupler (22) inside said female housing means (28);
   said locking means (30) including ring means (32) having a predetermined thickness and surface area, said ring means (32) further including a flat side surface (38) and an inner chambered surface (40) creating a tooth (41) for allowing said leading nose (24) and said relief (26) of said male coupler (22) to pass therethrough, said tooth (41) abutting said relief (26) to lock said male coupler (22) substantially inside said female housing means;
   said locking means (30) further including biasing means (34) for producing a force to continuously bias said ring means (32) into abutting engagement with said male coupler (22), said motion transmitting remote control assembly (10) characterized by lock access means (42) located in said female housing means for allowing an unlocking force to engage a portion of a circumference of said ring means (32) to unlock said locking means (30) and for limiting the surface area of said ring means (32) receiving the unlocking force to a portion of said circumference having a length and width both less than said predetermined thickness of said ring means (32).

2. An assembly (10) as set forth in claim 1 further characterized by said lock access means comprising a hole (42) in said female housing means (28).

3. An assembly (10) as set forth in claim 2 further characterized by said ring means (32) being fabricated of an incompressible material for rigidly receiving the forces applied thereupon.

4. An assembly (10) as set forth in claim 3 further characterized by retaining clip means (44) for selectively moving into and out of a locking position for locking said ring means (32) off-axis in relation to said longitudinal axis (18).

5. An assembly (10) as set forth in claim 4 further characterized by said retaining clip means (44) including a retaining clip (44) having two arms (48,50) extending substantially in the same direction and having a non-uniform space therebetween wherein one (48) of said two arms (48, 50) extends through said ring means (32) when said retaining clip (44) is in said locking position (46).

6. An assembly (10) as set forth in claim 5 further characterized by said female housing means (28) including track means (52) for guiding said retaining clip (44) and for securing said retaining clip (44) in said locking position (46).

7. An assembly (10) as set forth in claim 6 further characterized by said track means (52) including ridge means (54) for preventing said retaining clip (44) from moving out of said locking position.

8. An assembly (10) as set forth in claim 7 further characterized by said male coupler (22) being substantially cylindrical in shape.

9. An assembly (10) as set forth in claim 8 further characterized by biasing means comprising a compressible spring (34).

10. An assembly (10) as set forth in claim 9 further characterized by said ridge means (54) of said track means (52) having a thickness greater than the smallest part of said non-uniform space separating said two members of said retaining clip.

11. An assembly (10) as set forth in claim 10 further characterized by said female housing means (28) including guide means (60) on either side of said track means (58) for aligning said retaining clip (44) substantially parallel to said longitudinal axis (18).

12. An assembly (10) as set forth in claim 11 further characterized by said female housing means (28) further including attachment means (62) for attaching said female housing means (28) to the support structure (20).

13. An assembly (10) as set forth in claim 12 further characterized by said attachment means (62) comprising two mounting holes (64, 66) for receiving mounting screws (65, 67).

14. An assembly (10) as set forth in claim 13 further characterized by said two mounting holes (62, 64) being parallel to each other and substantially perpendicular to said longitudinal axis (18).

15. An assembly (10) as set forth in claim 14 further characterized by said two mounting holes (62, 64) being spaced equidistant from said longitudinal axis (18).

16. An assembly (10) as set forth in claim 15 further characterized by said female housing means (28) having a first inner diameter larger than the outer circumference of said male coupler (22).

17. An assembly (10) as set forth in claim 16 further characterized by said female housing means (28) including recess means (74) for receiving said retaining clip (44).

* * * * *